United States Patent [19]
Connell

[11] Patent Number: 4,992,131
[45] Date of Patent: Feb. 12, 1991

[54] METHOD OF REMOVING INDICIA FROM A SUPPORT

[76] Inventor: Michial A. Connell, 622 Bowers, Clawson, Mich. 48017

[21] Appl. No.: 474,494

[22] Filed: Feb. 2, 1990

[51] Int. Cl.$^{5}$ ............................................ B32B 31/16
[52] U.S. Cl. ...................................... 156/344; 40/594; 40/620; 156/584
[58] Field of Search .................. 40/594, 620; 156/344, 156/584

[56] References Cited

U.S. PATENT DOCUMENTS 4,654,101 3/1987 Kane .................................. 156/250
4,690,724 9/1987 Outlaw ................................ 156/584
4,746,388 5/1988 Inaba et al. ......................... 156/241

FOREIGN PATENT DOCUMENTS 2090193 7/1982 United Kingdom ............... 156/344

*Primary Examiner*—Robert A. Dawson
*Attorney, Agent, or Firm*—Dykema Gossett

[57] ABSTRACT

A method of removing indicia from an underlying support is disclosed including the steps of placing a plastic sheet over the underlying indicia and heating the plastic sheet at positions corresponding to the indicia. As the plastic sheet is heated, the outline of the indicia begins to show through the sheet giving a visual indication to an operator when sufficient heat has been applied. The edges of the plastic sheet are not heated and can be easily peeled away from the underlying support to remove the indicia. The method disclosed in this application results in significant time saving from prior art methods that involve scraping or chemical processes.

14 Claims, 1 Drawing Sheet

METHOD OF REMOVING INDICIA FROM A SUPPORT

BACKGROUND OF THE INVENTION

This invention relates to a method of removing indicia from a support such as a sign. More particularly, this invention relates to a method of easily and quickly removing indicia from a static support such as a sign that may be fixed to the ground.

There is a need for a method of quickly removing indicia that is adhesively attached to a underlying support member such as a sign support or decals on a vehicle. It is often necessary to remove indicia as for instance when the company name on a permanent sign must be changed, or when body work is being done on a vehicle and a decal must be removed.

Attempts have been made in the prior art to remove these indicia by scraping them from the support member. Also, chemical removal processes have been utilized. These prior art methods have proved time consuming and inadequate.

An example of a prior art method is shown in U.K. Pat. No. 2,090,193. In this method a label which is adhesively attached to a textile material, is removed by placing a textile patch over the label, heat sealing the patch to the label and then applying a solvent to the reverse side of the substrate. The adhesive between the label and the substrate dissolves and the patch can then be removed along with the label. This process may be adequate for a thin substrate such as a textile, however it would not be useful in many applications to which this invention is directed. It is necessary for the practice of this prior art method that the substrate be somewhat permeable so solvent can reach the adhesive between the patch and the substrate. In the applications to which the present invention is directed, the support members may not be permeable, and the rear side of the support member may not even be accessible.

Another prior art method disclosed is illustrated in U.S. Pat. No. 4,690,724 in which an electrically heated decal stripping tool slides under a decal and melts the adhesive securing it to a surface. This is exemplary of the prior art method of scraping indicia from a support and is usually quite time consuming.

U.S. Pat. No. 4,746,388 discloses a lift-off tape for removing typed impressions from paper. This device may not be useful in several types of applications to which the present invention is directed.

U.S. Pat. No. 4,654,101, in FIG. 9, shows a method of removing indicia from signs by inserting a blade behind the indicia. This type of method has proven to be relatively time consuming when utilized in several applications to which the present invention is directed.

It is thus an object of the present invention to disclose a process of removing any type of adhesively attached indicia from any type of support that is relatively quickly and easily performed.

It is further an object of the present invention to disclose such a process that utilizes common tools and components.

SUMMARY OF THE INVENTION

The present invention discloses a method of removing indicia from a support including the steps of placing a plastic sheet over indicia to be removed and then performing an actuation step to actuate the sheet. The indicia to be removed can be any indicia that is adhesively attached to an underlying support. Once the indicia has been removed from the support, the plastic sheet is removed from the support leaving the underlying support free of the indicia to be removed.

This method of indicia removal is particularly useful in applications such as fixed signs that are embedded in the ground in front of a building. The company occupying a building changes over time and it would be desirable that the permanent sign be easily changed to accommodate the change of occupants in the building. In the present method, a plastic sheet is placed on a sign such that it overlies all of the indicia to be removed and is actuated to remove the indicia from the underlying support. A sign maintenance worker can easily remove the indicia on the sign and replace it with new indicia.

Of course, the teachings of the present invention apply to other sign applications, and to any application in which an indicia of some sort is adhesively attached to an underlying support.

In a disclosed embodiment of the present invention, the plastic sheet is adhesively attached to the underlying support and overlies all portions of the indicia to be removed. A heating element heats the plastic sheet in the area of the indicia to be removed such that the adhesive between the indicia and the underlying support softens and the sheet member bonds to the indicia. At least one edge of the plastic sheet is not heated. A worker is given a visual indication of when sufficient heat has been applied to a particular portion of indicia, since an outline will begin to show through the plastic sheet.

Once the heating element has heated the plastic sheet to the indicia, such that the indicia is no longer bonded to the support but is instead bonded to the sheet, the sheet is allowed to cool. A worker may then slowly peel the sheet from the underlying support by starting at one of the edges to which heat was not applied. The sheet will easily peel off the underlying support and removes the indicia along with it.

In a most preferred embodiment of the present invention, the plastic sheet is taped along at least one edge to the support. The heat element is not applied to any of the edges of the plastic sheet.

The plastic sheet is most preferably a polymerized thermo-shrink film covering. The heating element is preferably a standard electric heating element in the nature of an iron, or any other similar device.

The present invention also includes the combination of a sign correcting kit including a sheet of thermo-shrink film, a heating element and an adhesive member for attaching the plastic sheet to an underlying support.

Although the present invention is disclosed as a method of removing indicia from a sign, it should be understood that the teachings of this invention have application in removing any type of adhesively attached indicia to an underlying support. The invention has application in any types of sign, vehicle, or other types of supports and can remove bumper stickers, decals, striping and any other adhesively attached indicia, including decals mounted on a glass surface.

DETAILED DESCRIPTION OF A PREFERRED EMBODIMENT

Figure 1:
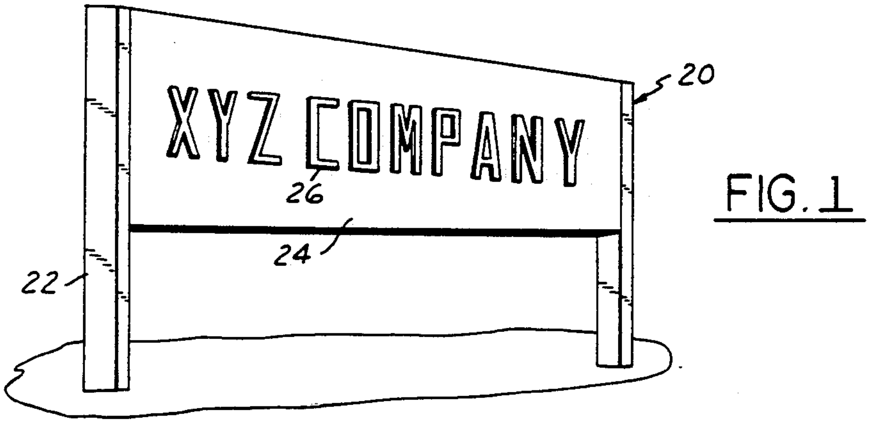
FIG. 1 is a perspective view showing a sign having indicia that is to be removed.

A preferred embodiment of the method of the present invention will now be disclosed with reference to FIGS. 1-5. FIG. 1 shows sign 20 with base 22 permanently embedded in the earth in front of a particular building. Sign 20 has support face 24 upon which are mounted indicia 26. These indicia are typically vinyl indicia adhesively attached to extend forwardly of support face 24. A permanently embedded sign such as sign 20 will often be in front of a building longer than the company that is occupying the building, and it often becomes necessary to remove the indicia from the sign when a new company occupies the building.

Figure 2:
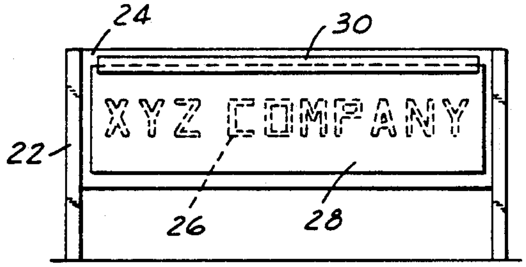
FIG. 2 illustrates the attachment of a removal member to the sign illustrated in FIG. 1.

FIG. 2 illustrates a first step in removing the indicia from sign 20. Removal member 28, which is preferably a sheet of plastic, is shown adhesively attached by tape 30 to support face 24. Plastic sheet 28 overlies all of indicia 26 that is to be removed and has borders at each of its four edges outside indicia 26.

Figure 3:
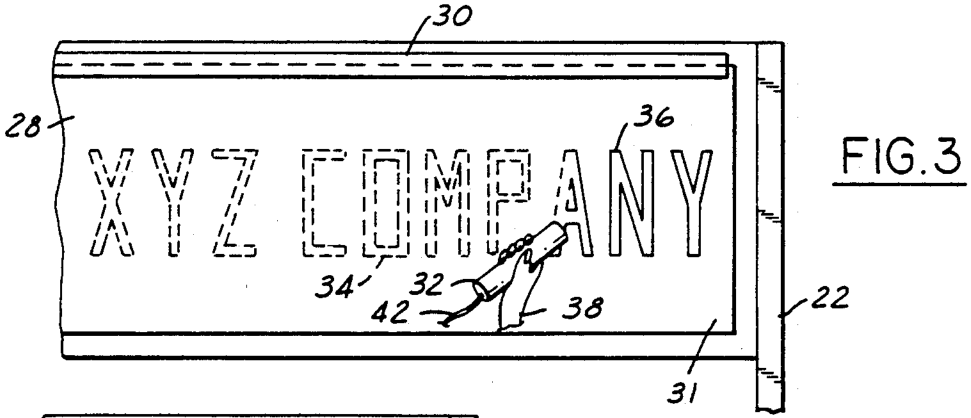
FIG. 3 illustrates the actuation of the removal member illustrated in FIG. 2.

FIG. 3 shows the actuation of plastic sheet 28 by heating element 32. Indicia 26 is shown having unheated indicia 34 and heated indicia 36 underlying plastic sheet 28. Operator 38 uses electric heating element 32, powered through cord 42, to heat plastic sheet 28 over indicia 26. As the indicia 26 are heated the adhesive securing them to support face 24 softens and they begin to bond to plastic sheet 28. As this happens, they begin to show in outline through plastic sheet 28, as illustrated at 36. The outlining of indicia 26 as shown at 36 gives a visual indication to operator 38 that enough heat has been applied to a particular area of indicia 26. Edges 31 of plastic sheet 28 are not heated and thus do not become secured to any portion of sign 20.

Figure 4:
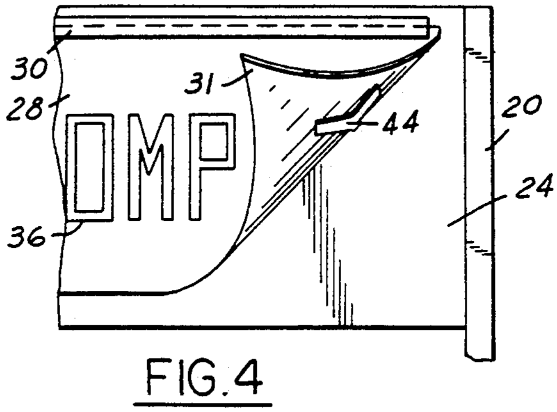
FIG. 4 illustrates the peeling of the removal member illustrated in FIG. 3.

Once all of indicia 26 has become heated indicia 36, plastic sheet 28 can be removed from support face 24. As shown in FIG. 4, edges 31 are initially peeled from support face 24 and removed indicia 44 will also be peeled with plastic sheet 28. An operator merely heats plastic sheet 28 for a short period of time and can then easily peel plastic sheet 28 away from support face 24, removing the underlying indicia 26.

Figure 5:
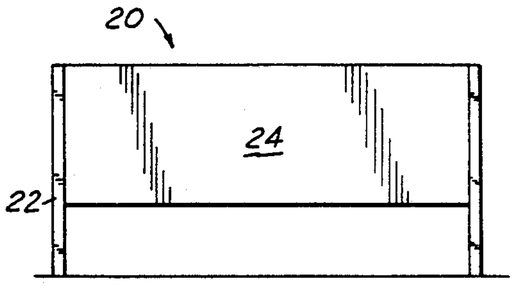
FIG. 5 shows the underlying sign support after indicia has been removed.

As shown in FIG. 5, support face 24 has now had indicia 26 removed and is clean and ready for the application of a new set of indicia.

Any type of heat actuatable plastic sheet may be utilized. Preferably a polymerized thermo-shrink film is utilized. Although an electric heat element is disclosed, other heat sources may be utilized.

The method of the present invention will now be reviewed with reference to FIGS. 1-5. Indicia 26 to be removed on support face 24 is identified. Plastic sheet 28 of sufficient dimensions to cover the entirety of indicia 26 is selected and secured through adhesive member 30 to a portion of support face 24. Heating element 32 applies heat to plastic sheet 28 in the area of indicia 26 until outlines 36 show through plastic sheet 28. Once the entirety of indicia 26 have been heated such that they show through plastic sheet 28, edges 31 of plastic sheet 28 are peeled away from support face 24 and remove the underlying indicia 26. The clean sign is then ready for the application of new indicia.

This invention further discloses a combination for sign correction that includes a sheet of polymerized thermo-shrink film covering, an electric heating element and an adhesive member for attaching the sheet to an underlying support.

While a preferred embodiment of the present invention has been disclosed, a worker of ordinary skill in the art would realize that certain modifications would be obvious from this disclosure and thus the following claims should be studied in order to determine the true scope and content of the present invention.

I claim:

1. A method of removing indicia from a backing member to which the indicia is adhesively attached comprising the steps of:

(A) placing a plastic sheet over the indicia to be removed, the plastic sheet having borders extending beyond the indicia;

(B) performing an actuation step to actuate the plastic sheet to remove the indicia, the activation step being the application of heat to the plastic sheet; and (C) removing the plastic sheet, leaving the backing member free of the indicia to be removed.

2. The method recited in claim 1, wherein the plastic sheet is a polymerized thermo-shrink film.

3. The method of claim 1, wherein the heating of the plastic sheet is continued until a visual signal appears that heating is no longer necessary.

4. The method of claim 1, wherein the visual signal is the appearance of the outline of the indicia to be removed through the plastic sheet.

5. The method of claim 1, wherein at least one edge of the plastic sheet is not heated and is thus easily removable from the backing member.

6. The method of claim 5, wherein the removal of the plastic sheet recited in step C is performed by peeling the plastic sheet away from the backing member.

7. The method of claim 6, wherein the plastic sheet is attached to the backing member by an adhesive tape.

8. The method of claim 1, wherein the backing member is a sign that is permanently embedded in the earth.

9. The method of claim 1, wherein the heat is not applied to the four edges of the plastic sheet and the removal of the plastic sheet is performed by peeling the plastic sheet away from the backing member.

10. The method of claim 2, wherein the plastic sheet is attached to the backing member by an adhesive tape.

11. The method of claim 1, wherein the indicia are vinyl indicia adhesively attached to the backing member.

12. The method of claim 1, wherein the heating is provided by an electric heating element.

13. A method of removing indicia from a backing member including the steps of:

(A) placing a plastic sheet over the indicia to be removed, and attaching it to the backing member by an adhesive tape, the plastic sheet being a polymerized thermo-shrink film;

(B) performing an actuation step to actuate the plastic sheet to remove the indicia, the actuation step being the application of heat to the plastic sheet by an electric heating element, at least one edge of the plastic sheet not being heated and thus easily removable from the underlying support;

(C) continuing the heating of the plastic sheet until a visual signal appears that the heating is no longer necessary, the visual signal being the appearance of the outline of the indicia to be removed through the plastic sheet;

(D) removing the plastic sheet by peeling the plastic sheet away from the backing member, leaving the backing member free of the indicia to be removed, the backing member being a sign permanently embedded in the ground and the indicia being vinyl indicia adhesively attached to the backing member.

14. The method of claim 13, wherein at least one edge of the plastic sheet is not heated and is thus easily removable from the backing member.

* * * * *